(12) United States Patent
Downing et al.

(10) Patent No.: US 10,477,619 B2
(45) Date of Patent: Nov. 12, 2019

(54) NETWORKED BATTLE SYSTEM OR FIREARM

(71) Applicants: Warren Downing, Ottawa (CA); David Walter Compton, Kitchener (CA)

(72) Inventors: Warren Downing, Ottawa (CA); David Walter Compton, Kitchener (CA)

(73) Assignee: COLT CANADA IP HOLDING PARTNERSHIP, Kitchener, Ontario ( * ) Notice: Subject to any disclaimer, the term of this patent is extended or adjusted under 35 U.S.C. 154(b) by 357 days.

(21) Appl. No.: 14/808,535

(22) Filed: Jul. 24, 2015

(65) Prior Publication Data

US 2016/0025462 A1 Jan. 28, 2016

Related U.S. Application Data (63) Continuation-in-part of application No. 13/956,582, filed on Aug. 1, 2013, now Pat. No. 9,921,028, and a continuation-in-part of application No. 13/372,825, filed on Feb. 14, 2012, now Pat. No. 9,891,023, said application No. 13/956,582 is a continuation-in-part
(Continued)

(51) Int. Cl.
| | |
|---|---|
| *F41G 3/26* | (2006.01) |
| *F41G 3/28* | (2006.01) |
| *H04W 84/12* | (2009.01) |
| *H02J 50/10* | (2016.01) |
| *F41G 11/00* | (2006.01) |
| *H04B 3/54* | (2006.01) |
| *H04B 5/00* | (2006.01) |
| *H02J 5/00* | (2016.01) |

(52) U.S. Cl.
CPC .......... *H04W 84/12* (2013.01); *F41G 11/003* (2013.01); *H02J 50/10* (2016.02); *H04B 3/548* (2013.01); *H04B 5/0031* (2013.01); *H04B 5/0037* (2013.01); *H02J 5/005* (2013.01); *H04B 5/0081* (2013.01)

(58) Field of Classification Search
CPC ........................................................ F41G 3/26
USPC ........................................................ 235/404
See application file for complete search history.

(56) References Cited

U.S. PATENT DOCUMENTS

| | | |
|---|---|---|
| 1,950,835 A | 3/1934 | Zajac |
| 4,533,980 A | 8/1985 | Hayes |
| (Continued) | | |

FOREIGN PATENT DOCUMENTS

| | | |
|---|---|---|
| CA | 2547081 | 6/2005 |
| CA | 2537839 | 9/2005 |
| (Continued) | | |

OTHER PUBLICATIONS

English Abstract of DE102004045753.
(Continued)

*Primary Examiner* — Toan C Ly
(74) *Attorney, Agent, or Firm* — Cantor Colburn LLP (57) ABSTRACT

A firearm includes one or more rails to which accessories may be mounted. The rails provide a communication path over which data may be transferred between the accessories and a processor located in the rails or in the firearm. The processor may cause the data to be sent to another location and may receive other data from other locations to provide a network of intercommunicating firearms that may deployed in a battlefield environment.

7 Claims, 7 Drawing Sheets

Related U.S. Application Data of application No. 12/688,256, filed on Jan. 15, 2010, now Pat. No. 9,823,043, application No. 14/808,535, which is a continuation-in-part of application No. 14/517,334, filed on Oct. 17, 2014, and a continuation-in-part of application No. 14/762,210, filed on Jul. 21, 2015, now Pat. No. 9,835,745, and a continuation-in-part of application No. 14/481,542, filed on Sep. 9, 2014, and a continuation-in-part of application No. 13/968,882, filed on Aug. 16, 2013, now Pat. No. 9,897,411.

(60) Provisional application No. 61/684,062, filed on Aug. 16, 2012, provisional application No. 61/443,085, filed on Feb. 15, 2011, provisional application No. 61/528,728, filed on Aug. 29, 2011, provisional application No. 61/976,157, filed on Apr. 7, 2014, provisional application No. 62/003,006, filed on May 26, 2014, provisional application No. 61/875,468, filed on Sep. 9, 2013, provisional application No. 62/106,394, filed on Jan. 22, 2015, provisional application No. 62/120,302, filed on Feb. 24, 2015, provisional application No. 62/166,427, filed on May 26, 2015.

(56) References Cited

U.S. PATENT DOCUMENTS

| | | |
|---|---|---|
| 5,033,219 A | 7/1991 | Johnson et al. |
| 5,142,806 A | 9/1992 | Swan |
| 5,237,773 A | 8/1993 | Claridge |
| 5,345,707 A | 9/1994 | Randall |
| 5,360,949 A | 11/1994 | Duxbury |
| 5,555,662 A | 9/1996 | Teetzel |
| 5,557,872 A | 9/1996 | Langner |
| 5,654,594 A | 8/1997 | Bjornsen, III et al. |
| 5,669,174 A | 9/1997 | Teetzel |
| 5,822,905 A | 10/1998 | Teetzel |
| 5,826,363 A | 10/1998 | Olson |
| 5,831,841 A | 11/1998 | Nishino |
| 6,163,131 A | 12/2000 | Gartstein et al. |
| 6,219,952 B1 | 4/2001 | Mossberg et al. |
| 6,237,271 B1 | 5/2001 | Kaminski |
| 6,412,207 B1 | 7/2002 | Crye et al. |
| 6,430,861 B1 | 8/2002 | Ayers et al. |
| 6,490,822 B1 | 12/2002 | Swan |
| 6,499,245 B1 | 12/2002 | Swan |
| 6,508,027 B1 | 1/2003 | Kim |
| 6,513,251 B2 | 2/2003 | Huang et al. |
| 6,618,976 B1 | 9/2003 | Swan |
| 6,622,416 B2 | 9/2003 | Kim |
| 6,779,288 B1 | 8/2004 | Kim |
| 6,792,711 B2 | 9/2004 | Battaglia |
| 6,847,587 B2 | 1/2005 | Patterson et al. |
| 6,849,811 B1 | 2/2005 | Heflin et al. |
| 6,854,206 B2 | 2/2005 | Oz |
| 6,865,599 B2 | 3/2005 | Zhang |
| 6,895,708 B2 | 5/2005 | Kim et al. |
| 6,899,539 B1 | 5/2005 | Stallman et al. |
| 6,918,066 B2 | 7/2005 | Dutta et al. |
| 6,925,744 B2 | 8/2005 | Kincel |
| 6,931,775 B2 | 8/2005 | Burnett |
| 7,007,586 B2 | 3/2006 | Larroque-Lahitette et al. |
| 7,059,076 B2 | 6/2006 | Stoner et al. |
| 7,096,619 B2 | 8/2006 | Jackson et al. |
| 7,121,036 B1 | 10/2006 | Florence et al. |
| 7,124,531 B1 | 10/2006 | Florence et al. |
| 7,131,228 B2 | 11/2006 | Hochstrate |
| 7,144,830 B2 | 12/2006 | Hill et al. |
| RE39,465 E | 1/2007 | Swan |
| 7,216,451 B1 | 5/2007 | Troy |
| 7,231,606 B2 | 6/2007 | Miller et al. |
| 7,243,454 B1 | 7/2007 | Cahill |
| D556,289 S | 11/2007 | Yu |
| 7,316,003 B1 | 1/2008 | Dulepet et al. |
| RE40,216 E | 4/2008 | Swan |
| 7,363,741 B2 | 4/2008 | Desomma et al. |
| 7,421,817 B2 | 9/2008 | Larsson |
| 7,421,818 B2 | 9/2008 | Houde-Walter |
| 7,438,430 B2 | 10/2008 | Kim |
| 7,458,179 B2 | 12/2008 | Swan |
| 7,461,346 B2 | 12/2008 | Fildebrandt |
| 7,464,495 B2 | 12/2008 | Cahill |
| 7,523,580 B1 | 4/2009 | Tankersley |
| 7,525,203 B1 | 4/2009 | Racho |
| 7,548,697 B2 | 6/2009 | Hudson et al. |
| 7,551,121 B1 | 6/2009 | O'Connell et al. |
| 7,554,316 B2 | 6/2009 | Stevens et al. |
| 7,559,169 B2 | 7/2009 | Hung et al. |
| 7,562,483 B2 | 7/2009 | Hines |
| 7,584,569 B2 | 9/2009 | Kallio et al. |
| 7,605,496 B2 | 10/2009 | Stevens et al. |
| 7,627,975 B1 | 12/2009 | Hines |
| 7,640,690 B2 | 1/2010 | Hines |
| 7,676,975 B2 | 3/2010 | Phillips et al. |
| 7,698,983 B1 | 4/2010 | Pinto et al. |
| D616,521 S | 5/2010 | Starnes |
| 7,707,762 B1 | 5/2010 | Swan |
| 7,712,241 B2 | 5/2010 | Teetzel et al. |
| 7,750,814 B2 | 7/2010 | Fisher et al. |
| 7,775,150 B2 | 8/2010 | Hochstrate |
| 7,793,452 B1 | 9/2010 | Samson et al. |
| 7,818,910 B2 | 10/2010 | Young |
| 7,841,120 B2 | 11/2010 | Teetzel et al. |
| 7,866,083 B2 | 1/2011 | Teetzel |
| 7,868,587 B2 | 1/2011 | Stevens et al. |
| 7,908,784 B2 | 3/2011 | Kim |
| 7,909,490 B2 | 3/2011 | Chou et al. |
| 7,953,369 B2 | 5/2011 | Baarman |
| 7,954,971 B1 | 6/2011 | Kincaid et al. |
| 7,975,419 B2 | 7/2011 | Darian |
| 7,985,527 B2 | 7/2011 | Tokunaga |
| 7,990,147 B2 | 8/2011 | Driemel et al. |
| 7,994,752 B2 | 8/2011 | Soar |
| 8,001,715 B2 | 8/2011 | Stokes |
| 8,005,995 B2 | 8/2011 | Ito et al. |
| 8,028,459 B2 | 10/2011 | Williams |
| 8,028,460 B2 | 10/2011 | Williams |
| 8,035,340 B2 | 10/2011 | Stevens et al. |
| 8,039,995 B2 | 10/2011 | Stevens et al. |
| 8,042,967 B2 | 10/2011 | Hikmet et al. |
| 8,063,773 B2 | 11/2011 | Fisher |
| 8,091,265 B1 | 1/2012 | Teetzel et al. |
| 8,104,211 B2 | 1/2012 | Darian |
| 8,141,288 B2 | 3/2012 | Dodd et al. |
| 8,146,282 B2 | 4/2012 | Cabahug et al. |
| 8,151,505 B2 | 4/2012 | Thompson |
| 8,225,542 B2 | 7/2012 | Houde-Walter |
| 8,251,288 B2 | 8/2012 | Woitalla et al. |
| 8,311,757 B2 | 11/2012 | Lin |
| 8,336,776 B2 | 12/2012 | Horvath et al. |
| 8,347,541 B1 | 1/2013 | Thompson |
| 8,371,729 B2 | 2/2013 | Sharrah et al. |
| 8,453,369 B1 | 6/2013 | Kincaid et al. |
| 8,458,944 B2 | 6/2013 | Houde-Walter |
| 8,464,459 B1 | 6/2013 | Summers |
| 8,485,085 B2 | 7/2013 | Goree et al. |
| 8,495,945 B1 | 7/2013 | Kirchner et al. |
| 8,516,731 B2 | 8/2013 | Cabahug et al. |
| 8,528,244 B2 | 9/2013 | Scallie et al. |
| 8,572,292 B2 | 10/2013 | Ito et al. |
| 8,635,798 B2 | 1/2014 | Mulfinger |
| 8,668,496 B2 | 3/2014 | Nolen |
| 8,739,672 B1 | 6/2014 | Kelly |
| 8,826,575 B2 | 9/2014 | Ufer et al. |
| 9,010,002 B2 | 4/2015 | Popa-Simil |
| 9,151,564 B1 | 10/2015 | Baxter |
| 2002/0174588 A1 | 11/2002 | Danner et al. |
| 2003/0029072 A1 | 2/2003 | Danielson et al. |
| 2003/0074822 A1 | 4/2003 | Faifer |
| 2003/0106251 A1 | 6/2003 | Kim |
| 2004/0121292 A1 | 6/2004 | Chung et al. |

(56) References Cited

U.S. PATENT DOCUMENTS

| | | | |
|---|---|---|---|
| 2004/0198336 A1* | 10/2004 | Jancic | F41G 1/35 455/420 |
| 2004/0241622 A1 | 12/2004 | White | |
| 2005/0000142 A1 | 1/2005 | Kim et al. | |
| 2005/0018041 A1 | 1/2005 | Towery et al. | |
| 2005/0033544 A1 | 2/2005 | Brooks et al. | |
| 2005/0109201 A1 | 5/2005 | Larroque-Lahitette et al. | |
| 2005/0204603 A1 | 9/2005 | Larsson | |
| 2005/0217161 A1 | 10/2005 | Haugen et al. | |
| 2005/0241206 A1 | 11/2005 | Teetzel et al. | |
| 2005/0241211 A1 | 11/2005 | Swan | |
| 2005/0268521 A1 | 12/2005 | Cox et al. | |
| 2006/0005447 A1 | 1/2006 | Lenner et al. | |
| 2006/0204935 A1 | 9/2006 | McAfee et al. | |
| 2006/0288626 A1 | 12/2006 | Kim | |
| 2007/0006509 A1 | 1/2007 | Desomma et al. | |
| 2007/0150556 A1 | 6/2007 | Fukuda et al. | |
| 2007/0216392 A1 | 9/2007 | Stevens et al. | |
| 2007/0228833 A1 | 10/2007 | Stevens et al. | |
| 2008/0010890 A1 | 1/2008 | Vice et al. | |
| 2008/0039962 A1* | 2/2008 | McRae | F41A 17/06 700/90 |
| 2008/0040965 A1 | 2/2008 | Solinsky et al. | |
| 2008/0063400 A1 | 3/2008 | Hudson et al. | |
| 2008/0092422 A1 | 4/2008 | Daniel et al. | |
| 2008/0108021 A1 | 5/2008 | Slayton et al. | |
| 2008/0134562 A1 | 6/2008 | Teetzel | |
| 2008/0170838 A1 | 7/2008 | Teetzel et al. | |
| 2008/0190002 A1 | 8/2008 | Hines | |
| 2008/0204361 A1 | 8/2008 | Scales et al. | |
| 2008/0216380 A1 | 9/2008 | Teetzel | |
| 2008/0219100 A1 | 9/2008 | Fisher et al. | |
| 2008/0301994 A1 | 12/2008 | Langevin et al. | |
| 2009/0044439 A1 | 2/2009 | Phillips et al. | |
| 2009/0058361 A1 | 3/2009 | John | |
| 2009/0108589 A1 | 4/2009 | Racho et al. | |
| 2009/0134713 A1 | 5/2009 | Stevens et al. | |
| 2009/0218884 A1 | 9/2009 | Soar | |
| 2009/0249216 A1 | 10/2009 | Charka et al. | |
| 2009/0255160 A1 | 10/2009 | Summers et al. | |
| 2009/0305197 A1 | 12/2009 | Lim et al. | |
| 2009/0322158 A1 | 12/2009 | Stevens et al. | |
| 2010/0031552 A1 | 2/2010 | Houde-Walter et al. | |
| 2010/0083553 A1 | 4/2010 | Montgomery et al. | |
| 2010/0095574 A1 | 4/2010 | Abst et al. | |
| 2010/0122485 A1 | 5/2010 | Kincel | |
| 2010/0126054 A1 | 5/2010 | Daniel et al. | |
| 2010/0154276 A1 | 6/2010 | Kim | |
| 2010/0154280 A1 | 6/2010 | LaFrance et al. | |
| 2010/0175293 A1 | 7/2010 | Hines | |
| 2010/0180485 A1 | 7/2010 | Cabahug et al. | |
| 2010/0181933 A1 | 7/2010 | Langovsky et al. | |
| 2010/0186278 A1 | 7/2010 | Daniel | |
| 2010/0192443 A1 | 8/2010 | Cabahug et al. | |
| 2010/0192444 A1 | 8/2010 | Cabahug et al. | |
| 2010/0192446 A1 | 8/2010 | Darian | |
| 2010/0192447 A1 | 8/2010 | Cabahug et al. | |
| 2010/0192448 A1 | 8/2010 | Darian et al. | |
| 2010/0196859 A1 | 8/2010 | Saugen et al. | |
| 2010/0218410 A1 | 9/2010 | Cabahug et al. | |
| 2010/0229448 A1 | 9/2010 | Houde-Walter et al. | |
| 2010/0242332 A1 | 9/2010 | Teetzel et al. | |
| 2010/0275489 A1 | 11/2010 | Cabahug et al. | |
| 2010/0279544 A1 | 11/2010 | Dodd et al. | |
| 2010/0281725 A1 | 11/2010 | Arbouw | |
| 2011/0000120 A1 | 1/2011 | Thompson et al. | |
| 2011/0006613 A1 | 1/2011 | Stevens et al. | |
| 2011/0010979 A1 | 1/2011 | Houde-Walter et al. | |
| 2011/0030257 A1 | 2/2011 | Gwillim, Jr. et al. | |
| 2011/0031928 A1 | 2/2011 | Soar | |
| 2011/0036337 A1 | 2/2011 | Freitag et al. | |
| 2011/0061284 A1 | 3/2011 | Cabahug et al. | |
| 2011/0089894 A1 | 4/2011 | Soar | |
| 2011/0099876 A1 | 5/2011 | Bentley | |
| 2011/0126622 A1 | 6/2011 | Turner | |
| 2011/0131858 A1 | 6/2011 | Darian et al. | |
| 2011/0162245 A1 | 7/2011 | Kamal et al. | |
| 2011/0162251 A1 | 7/2011 | Houde-Walter | |
| 2011/0173865 A1 | 7/2011 | Compton et al. | |
| 2011/0214328 A1 | 9/2011 | Williams et al. | |
| 2011/0239354 A1 | 10/2011 | Celona et al. | |
| 2011/0252741 A1 | 10/2011 | Travez et al. | |
| 2011/0264257 A1 | 10/2011 | Travez et al. | |
| 2011/0271822 A1 | 11/2011 | Myr | |
| 2011/0283585 A1 | 11/2011 | Cabahug et al. | |
| 2011/0283586 A1 | 11/2011 | Scallie et al. | |
| 2011/0285214 A1 | 11/2011 | Stevens et al. | |
| 2011/0306251 A1 | 12/2011 | Mulfinger et al. | |
| 2012/0021385 A1 | 1/2012 | Belenkii et al. | |
| 2012/0068536 A1 | 3/2012 | Stevens et al. | |
| 2012/0085331 A1 | 4/2012 | Lang et al. | |
| 2012/0097741 A1 | 4/2012 | Karcher | |
| 2012/0125092 A1 | 5/2012 | Downing | |
| 2012/0125189 A1 | 5/2012 | McLean, III et al. | |
| 2012/0131837 A1 | 5/2012 | Cabahug et al. | |
| 2012/0143368 A1 | 6/2012 | Travez et al. | |
| 2012/0144714 A1 | 6/2012 | Cabahug et al. | |
| 2012/0144716 A1 | 6/2012 | Cabahug et al. | |
| 2012/0180363 A1 | 7/2012 | Frascati et al. | |
| 2012/0180364 A1 | 7/2012 | Berntsen et al. | |
| 2012/0192476 A1 | 8/2012 | Compton et al. | |
| 2012/0214137 A1* | 8/2012 | Goree | F41A 17/063 434/19 |
| 2012/0233901 A1 | 9/2012 | Kim et al. | |
| 2012/0285064 A1 | 11/2012 | Houde-Walter et al. | |
| 2012/0317706 A1 | 12/2012 | Lebel et al. | |
| 2013/0047482 A1 | 2/2013 | Mulfinger et al. | |
| 2013/0047486 A1 | 2/2013 | Ding et al. | |
| 2013/0061504 A1 | 3/2013 | Malherbe et al. | |
| 2013/0061509 A1 | 3/2013 | Allen et al. | |
| 2013/0104438 A1 | 5/2013 | Hines et al. | |
| 2013/0104439 A1 | 5/2013 | Hines et al. | |
| 2013/0105579 A1* | 5/2013 | Miller | F41G 3/04 235/400 |
| 2013/0185978 A1 | 7/2013 | Dodd et al. | |
| 2013/0286239 A1 | 10/2013 | Lupher et al. | |
| 2013/0329211 A1 | 12/2013 | McHale et al. | |
| 2013/0337415 A1* | 12/2013 | Huet | F41G 3/26 434/21 |
| 2013/0344461 A1 | 12/2013 | Tello | |
| 2014/0007485 A1 | 1/2014 | Castejon, Sr. | |
| 2014/0028856 A1 | 1/2014 | Ehrlich | |
| 2014/0047754 A1 | 2/2014 | Compton et al. | |
| 2014/0052578 A1 | 2/2014 | Redwood | |
| 2014/0052878 A1 | 2/2014 | Ito et al. | |
| 2014/0059911 A1 | 3/2014 | Oh et al. | |
| 2014/0068990 A1 | 3/2014 | Cabahug et al. | |
| 2014/0130392 A1 | 5/2014 | Oh et al. | |
| 2014/0184476 A1 | 7/2014 | McHale et al. | |
| 2014/0360081 A1 | 12/2014 | Lupher et al. | |
| 2014/0378088 A1 | 12/2014 | Goel et al. | |
| 2015/0020427 A1 | 1/2015 | Compton et al. | |
| 2015/0026588 A1 | 1/2015 | Turcotte | |
| 2015/0041538 A1 | 2/2015 | Teetzel et al. | |
| 2015/0108215 A1 | 4/2015 | Ehrlich | |
| 2015/0176949 A1 | 6/2015 | Varshneya | |
| 2015/0285593 A1 | 10/2015 | Dribben | |
| 2015/0285599 A1 | 10/2015 | Downing | |
| 2015/0300786 A1 | 10/2015 | Downing et al. | |
| 2015/0345887 A1 | 12/2015 | Shneorson | |
| 2015/0345906 A1 | 12/2015 | Varshneya | |
| 2015/0369554 A1 | 12/2015 | Kramer | |
| 2016/0254462 A1 | 1/2016 | Downing et al. | |
| 2016/0033221 A1 | 2/2016 | Schmehl | |
| 2016/0084617 A1 | 3/2016 | Lyren | |
| 2016/0169627 A1 | 6/2016 | Northrup | |
| 2016/0216082 A1 | 7/2016 | Downing | |
| 2016/0223278 A1 | 8/2016 | Schechter | |
| 2016/0316128 A1 | 10/2016 | Teich | |

FOREIGN PATENT DOCUMENTS

| | | |
|---|---|---|
| CA | 2756018 | 9/2010 |
| CA | 2754852 | 11/2010 |

(56) References Cited

FOREIGN PATENT DOCUMENTS

| CA | 2754869 | | 11/2010 |
|---|---|---|---|
| CA | 2923506 | | 3/2015 |
| DE | 2251670 | A1 | 5/1974 |
| DE | 102004045753 | | 3/2006 |
| EP | 2587659 | A1 | 5/2013 |
| TW | 200715159 | A | 4/2007 |
| WO | 2005080908 | A2 | 9/2005 |
| WO | 2005109597 | A1 | 11/2005 |
| WO | 2007107975 | A1 | 9/2007 |
| WO | 2008048116 | A1 | 4/2008 |
| WO | 2008108818 | A2 | 9/2008 |
| WO | 2009127354 | A2 | 10/2009 |
| WO | 2009151713 | A2 | 12/2009 |
| WO | 2010004470 | | 1/2010 |
| WO | 2010107324 | A1 | 9/2010 |
| WO | 2011079233 | A2 | 6/2011 |
| WO | 2011162245 | A1 | 12/2011 |
| WO | 2013066472 | | 5/2013 |
| WO | 2013112242 | | 8/2013 |
| WO | 2013120015 | A1 | 8/2013 |
| WO | 2014026274 | A1 | 2/2014 |
| WO | 2015031993 | A1 | 3/2015 |

OTHER PUBLICATIONS

International Preliminary Report on Patentability of the International Searching Authority, or the Declaration for PCT/CA2012/050080; dated Aug. 29, 2013, 6 pages.
International Search Report and the Written Opinion of the International Searching Authority, or the Declaration; for PCT/CA2012/005080; dated May 16, 2012, 13 pages.
International Search Report and the Written Opinion of the International Searching Authority, or the Declaration; for PCT/CA2014/050837; dated Oct. 27, 2014, 20 Pages.
International Search Report and the Written Opinion of the International Searching Authority, or the Declaration; for PCT/CA2014/050854; dated Nov. 6, 2014, 8 Pages.
International Search Report and the Written Opinion of the International Searching Authority, or the Declaration; for PCT/CA2010/000039 dated Oct. 15, 2010, 9 Pages.
Corrected International Search Report and the Written Opinion of the International Searching Authority, or the Declaration; for PCT/CA2012/050080; dated Jun. 4, 2012, 16 pages.
International Search Report and the Written Opinion of the International Searching Authority, or the Declaration; for PCT/CA2013/050598; dated Nov. 8, 2013, 13 Pages.
International Preliminary Report on Patentability of the International Searching Authority, or the Declaration for PCT/CA2013/050598; dated Sep. 4, 2014, 52 pages.
Machine Translation of claims of DE102004045753.
Machine Translation of Specification of DE102004045753.
Notification of Transmittal of the International Search Report and the Written Opinion of the International Searching Authority, or the Declaration; PCT/CA2014/051006; Dec. 23, 2014, 9 Pages.
Singapore Search Report dated Oct. 15, 2013 for Application No. 201205195-9, 18 Pages.
International Search Report for International Application No. PCT/CA2015/0051369; International Filing Date: Dec. 23,2015; dated Mar. 8, 2016; 8 pgs.
"Interoperability and Integration of Dismounted Soldier System Weapon Systems Update"; Mr. Mark Richter; Chairman; SCI-178 RTG-043; May 21, 2008, 38 Pages.
"Interoperability and Integration of Dismounted Soldier System Weapon Systems"; Major Bruce Gilchrist on behalf of Mr. Mark Richter; SCI-178 RTG-043; May 20, 2009.
"NATO Small Arms Weapons Research & Technology Study"; Per G. Arvidsson; Team Leader Technical Interfaces; NATO RTO Study SCI-178/RTG-043, 13 Pages.
"Powered Rail"; Presentation to Intl Infantry & Joint Service Small Arms System Symposium; May 20, 2009; Torbjoern Eld, Chairman; Powered rail team; NATO SCI-178/RTG-043, 9 Pages.
CA Examination report for Application No. 2014331482, dated Mar. 22, 2017, 4 pages.
CA Offfice Action for Application No. 2,923,513, dated Apr. 28, 2017, 5 pages.
European Search Report for Application No. 15878323, dated Aug. 9, 2018, 3 pages.
European Search Report for Application No. EP 14 84 1869; dated Aug. 22, 2017.
European Search Report for Application No. Ep 14 85 1134; dated Aug. 23, 2017, 3 pages.
European Search Report for Application No. EP 14 88 9015; dated Aug. 23, 2017.
European Search Report for Application No. EP 16 19 5258, dated Mar. 29, 2017, 4 pages.
European Written Opinion for Application No. 16162291.5; dated Jun. 22, 2016; 3 pgs.
Extended European Search Report for EP Application No. 16162291.5; dated Jun. 22, 2016.
Hoffman, Mike, "DARPA Develops Infantry Helmet Heads Up Displau", Kit Up!, Oct. 5, 2017, 9 pages.
International Search Report and Written Opinion for International Application No. PCT/CA2016/050591; dated Jul. 21, 2016.
International Search Report for International Application No. PCT/CA2016/050591; International Filing Date: May 2016; dated Jul. 21, 2016; 4 pgs.
Supplementary European Search Report for Application No. 15878323.3-1206, dated Aug. 9, 2018 3 pages.
Supplementary European Search Report for Application No. 16798995, dated Nov. 30, 2018, 3 pages.
Written Opinion for Application No. EP 14 85 1134; dated Aug. 23, 2017, 4 pages.
Written Opinion for Application No. EP 14 88 9015; dated Aug. 23, 2017.
Written Opinion for EP Application No. 15878323.3, dated Aug. 9, 2018, 8 pages.
Written Opinion for International Application No. PCT/CA2016/050591; International Filing Date: May 26, 2016; dated Jul. 21, 2016; 6 pgs.
Written Opinion of Application No. 16798995.3, dated Nov. 30, 2018, 6 pages.

* cited by examiner

NETWORKED BATTLE SYSTEM OR FIREARM

CROSS REFERENCE TO RELATED APPLICATIONS

This application is a continuation-in-part of U.S. patent application Ser. No. 13/956,582, filed on Aug. 1, 2013, which claims the benefit of U.S. Provisional Application 61/684,062, filed on Aug. 16, 2012, the contents each of which are incorporated herein by reference thereto.

This application is a continuation-in-part of U.S. patent application Ser. No. 14/517,334, filed on Oct. 17, 2014 which claims the benefit of U.S. Provisional Application 61/976,157, filed on Apr. 7, 2014 and U.S. Provisional Patent Application 62/003,006, filed on May 26, 2014, the contents each of which are incorporated herein by reference thereto.

This application is a continuation-in-part of U.S. patent application Ser. No. 13/968,882, filed on Aug. 16, 2013, the contents each of which are incorporated herein by reference thereto.

This application claims the benefit of U.S. Provisional Patent Application No. 62/106,394, filed Jan. 22, 2015, U.S. Provisional Patent Application No. 62/120,302, filed Feb. 24, 2015 and U.S. Provisional Patent Application No. 62/166,427, filed May 26, 2015, the contents each of which are incorporated herein by reference thereto.

Reference is also made to U.S. patent application Ser. No. 13/372,825, filed on Feb. 14, 2012, U.S. Provisional Patent Application 61/443,085, filed on Feb. 15, 2011. U.S. Provisional Patent Application 61/528,728, filed on Aug. 29, 2011, the contents each of which are incorporated herein by reference thereto.

Reference is also made to U.S. patent application Ser. No. 13/956,582, filed on Aug. 1, 2013, which is a continuation-in-part of U.S. patent application Ser. No. 12/882,256, filed on Jan. 15, 2010 and U.S. patent application Ser. No. 14/517,334 filed on Oct. 17, 2014, which is a continuation-in-part of U.S. patent application Ser. No. 14/476,210, filed on Sep. 3, 2014 and U.S. patent application Ser. No. 14/481,542, filed on Sep. 9, 2014, the contents each of which are incorporated herein by reference thereto.

Reference is also made to U.S. patent application Ser. No. 14/762,210 filed on Sep. 3, 2014, which claims the benefit of U.S. Provisional Patent Application 61/875,468, filed on Sep. 9, 2013, the contents each of which are incorporated herein by reference thereto.

BACKGROUND

Embodiments of the invention relate generally to systems and method of providing information between one or more different battlefield participants.

Communication of information between different battlefield participants (e.g., soldiers) may improve battle results. Further, the more information communicated, the more the improvement.

During battle several different components may be used. These include, for example, rifles, scopes, grenade launchers and communication devices. Some of these components may provide for different views and angles of attack in a battlefield situation.

SUMMARY OF THE INVENTION

In one exemplary embodiment, a weapon is disclosed that provides information regarding its position and orientation to a central location that can interpret and display this information.

In one embodiment, a networked battle system is disclosed. The system includes: a communication network; a first rifle that includes at least one accessory coupled thereto that determines a bearing of the first rifle; a communication element coupled to the rifle allowing the at least one accessory to provide bearing information to the communication network; and a battle management system in communication with the first rifle through the communication network that receives the bearing information from the accessory and updates a battle plan based on the bearing information to form an updated battle plan.

In another embodiment, a rifle is disclosed. The rifle includes: a rail system carried by an upper receiver of the rifle; at least one accessory coupled to the rail system that determines a bearing of the rifle; a communication element coupled to the rail system; at least one sensor coupled to the rail; and a microprocessor carried in either the rail system or a portion of the rifle. In this embodiment, information is provided from the sensor to the microprocessor through the rail system and then provided to the communication element through the rail system for transmission to a communication network.

In another embodiment, a battlefield system that includes a bearing sensor that determines a bearing of a battlefield device is disclosed. The system also includes a microprocessor in communication with the bearing sensor and carried either on or in the battlefield device and a communication element carried by the battlefield device. In this system information is provided from the sensor to the microprocessor and then provided to the communication element for transmission to a communication network.

Other aspects and features of embodiments of the invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The term "firearm" as used herein, refers at least to a rifle, machine gun, weapon, and pistol and may be automatic, semi-automatic or otherwise. Another example of a firearm includes a grenade launcher, mortar launcher or the like. A power or non-powered rail on a firearm may have certain accessories attached to it. The accessories include, for example, telescopic sights, tactical sights, laser sighting modules, Global Positioning Systems (GPS), bearing sensors, inclination sensors, laser distance measuring devices, accelerometers, microphones, video cameras, cameras and night vision scopes. This list is not meant to be exclusive, merely an example of accessories that may utilize a rail. Any of the devices (e.g., rifles, firearms, spotter scopes, etc.) disclosed herein may be referred to from time to time as a battlefield device.

Figure 1:
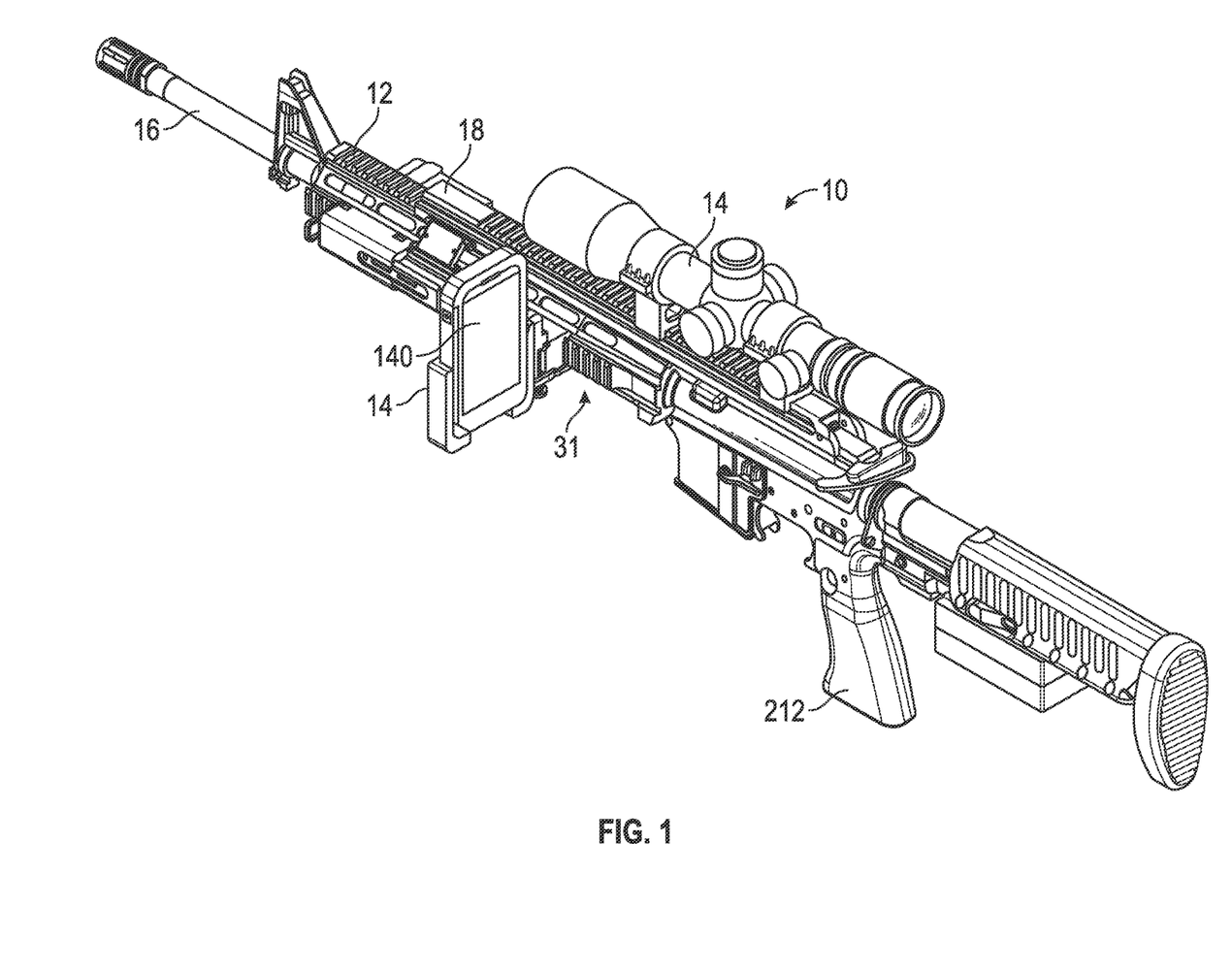
FIG. 1 is a perspective view of firearm embodied as a rifle according to one embodiment.

Referring now to FIG. 1, a perspective view of a rifle, weapon, firearm, (automatic, semi-automatic or otherwise) 10 is illustrated. Rifle, weapon, firearm, etc. 10 has a plurality of rails 12. In one embodiment, rails 12 may be anyone of a MIL-STD-1913 rail, Weaver rail, NATO STANAG 4694 accessory rail or equivalents thereof. Rails 12 are configured to allow a plurality of accessories 14 to the rifle 10. Rails 12 are mounted at the 12 o'clock, 3 o'clock, 6 o'clock and 9 o'clock positions with respect to a longitudinal or firing axis of the rifle and/or a barrel 16 of the rifle 10.

Accessories 14 may be any one of telescopic sights, tactical sights, laser sighting modules, Global Positioning Systems (GPS) and night vision scopes or any type of sensor. The aforementioned accessories are merely an example of contemplated accessories for use with rifle or firearm 10. A specific example of an attached accessory is shown as personal data assistant (PDA) 140 or cellular telephone in FIG. 1. This PDA may have a screen to display information (e.g., maps, target locations, video or other visual information) and receive information from a user (e.g., a touch screen or other input devices). In accordance with an exemplary embodiment, accessories 14 are items that require a source of power and/or require data communication with another component of the rifle or firearm 10 or a system in which rifle or firearm 10 is employed. Of course, one or more the accessories may have its own power supply and may be able to communicate data independent of the firearm.

A portion of a powering rail configured as a MIL-STD-1913 rail is shown generally as 12. Rail 12 is a MIL-STD-1913 rail, such as a Weaver rail, NATO STANAG 4694 accessory rail or the like. Sliding over rail 12 is a powered or powering rail 18.

Figure 2:
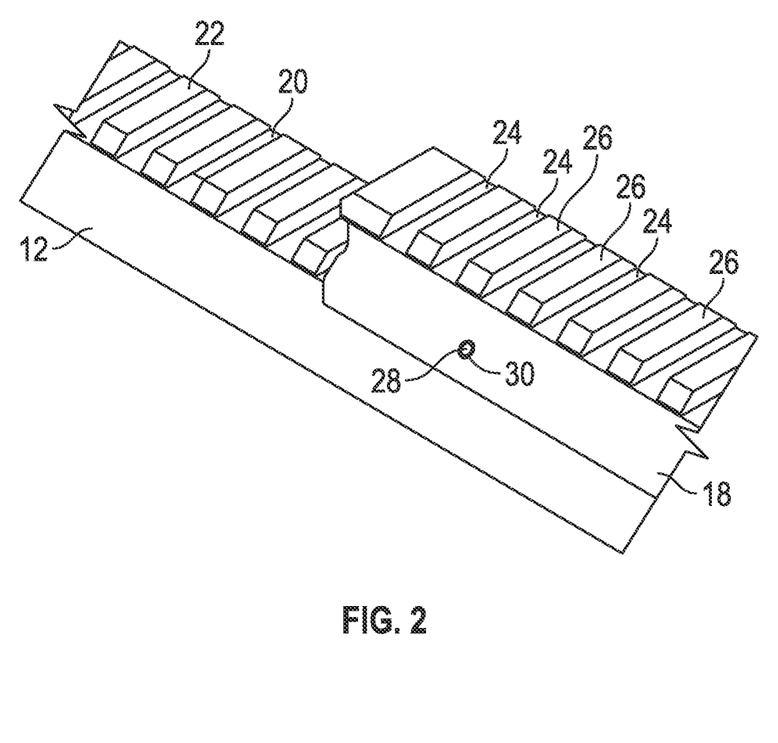
FIG. 2 shows an example of a rail configuration according to one embodiment.

With reference to FIG. 2, rail 12 has a plurality of rail slots 20 and rail ribs 22, which are utilized in receiving an accessory of another rail such as powering rail 18. Powering rail 18 comprises a plurality of rail slots 24 and rail ribs 26 in a configuration that allows for the mating of accessories with powering rail 18.

In one embodiment, powering rail 18 is mounted to rail 12 via a cross pin 28 or other device received within a pin hole 30 of powering rail 18. The pin hole 30 accepts the cross pin 28 so that the pin 28 locks and secures the rails 12 and 18 together. Although FIG. 1 illustrates rail 18 secured to a top rail 12 of an upper receiver 31 of rifle or firearm 10 rail 18 can also be secured in additional locations such as the 3, 6 and 9 o'clock rail 12 locations. Still further, rail 18 may be secured to anyone or any combination of the 3, 6 and 9 o'clock rail 12 locations. In addition and in one alternative embodiment, powering rail 18 may be formed into anyone of rails 12 such that a separate rail 18 is not necessary. In other words and in this embodiment, the rail 12 is now the networked power and/or data transmitting rail.

As discussed further below, the rail 18 may also provide a path for transferring data from any or all of the accessories 14 to one or more processors carried in the firearm 10. Such processors may be located, for example, in the rail 18 or the pistol grip 212 or both. Also, the accessories themselves may have the ability to receive information back from the processors and transmit to a location remove from the firearm 10. For instance, information from sensors on the firearm 10 may be routed to the processors and then provided to the PDA 140 for transmission to an external location. This communication may be through a rail or direct in which case a rail may be omitted entirely.

Figure 3:
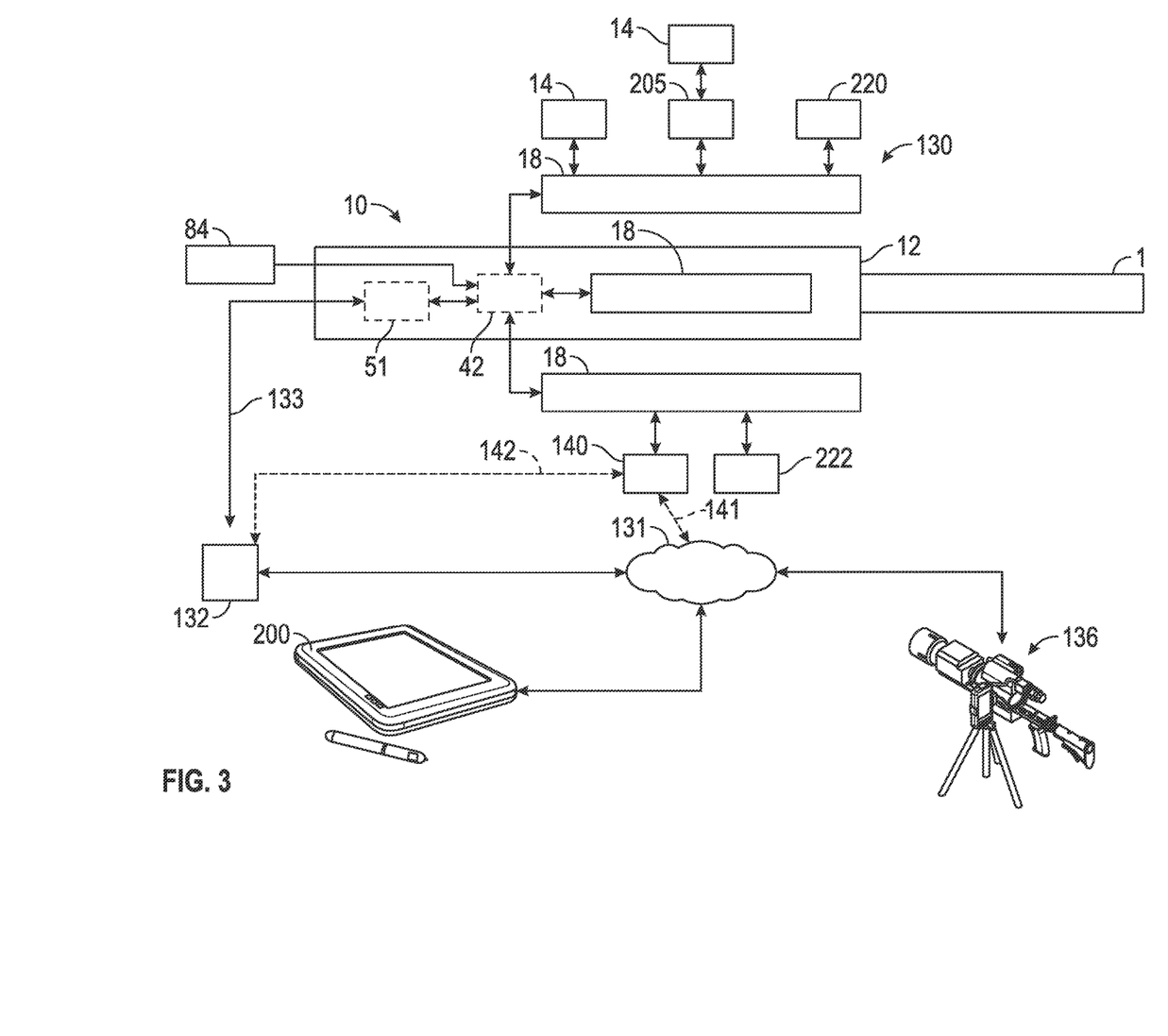
FIG. 3 is high-level system diagram illustrating a network formed between a firearm and another device.

Referring now to FIG. 3, a schematic illustration of a system 130, using various embodiments of the present invention is illustrated. As illustrated, a firearm 10 includes a barrel 1 and has a plurality of powering rails 18 (e.g., 3 o'clock, 6 o'clock, 9 o'clock and 12 o'clock locations with respect to a longitudinal axis of the firearm 10 are provided, of course, any other locations are also contemplated). The powering rails 18 are attached, in one embodiment, to rail 12.

Each of the powering rails 18 are configured to transmit power to an associated accessory 14 via conductive couplings. The same or different couplings may also allow for the transmission of data though the rails 18 to/from the accessories. The couplings can be any type of coupling including, for example, inductive couplings and/or galvanic couplings including direct contact between two conductive materials. In one embodiment, one of data or power is transmitted via inductive couplings and the other of data or power is transmitted via galvanic couplings. More detailed description of the powering rails 18 and the manner in which power/data may be transferred is described in one or more the patents/patent applications mentioned above.

Each of the rails 18 are also configured to communicate with a rail master control unit or processor 42 via a data bus, which in turn allows all of the accessories 14 to communicate information to other processors in the firearm. For example, the firearm 10 may further include a processor 51 disposed in the grip 212 (FIG. 1) of the firearm. As discussed more fully below, the processor 51 may serve as the master control unit. In one embodiment, the processor 42 may be omitted.

To the extent that the processor 42 is included, it may be referred to as a bus processor herein and it controls access to the data bus formed by the powering rails to allow for the processor 51 to communicate information to and from the accessories 14. The bus processor 42 may be located in either the upper or lower receiver of the firearm 10 or may be disposed in/on rails 12 or power rails 18.

As illustrated, processor 51 is coupled via communication link 133 to a communication device 132 that may be worn, for example, in backpack or vest. This allows for the processor 51 to communicate with other devices 136/200 in the system as more fully described below. The communication link 133 may be wired or wireless or a combination thereof. The communication device 132 may communicate in any known manner including, but not limited to, rf communications, cellular communications, Bluetooth, and ZigBee and the communication path is generally shown as passing through a communication network 131. The communication network 131 can be any type of now known or later created network and may include one or more additional processors for routing or storing the information.

In one embodiment, the PDA 140 may also be able to provide information to and receive information from the communication network 131. For instance, accessories 14 in the form of sensors may provide information to the processor (42 or 51 or both) and receive information back from the processor and transmit it off the rifle 10 to the communication network 131. In one embodiment, the communication from the PDA 140 is direct to the communication network 131 via path 141 and in another embodiment, the PDA 140 communicates with the communication device 132 (path 142) which in turn provides communication to the communication network 131. It shall be further understood that any of the processors 51/42 or the PDA may operate as a server in communication with each other or external server. For instance, the PDA 140 may operate as a server that connects the processors 42/51 to a battle management system. As a server, the PDA may also be able to process map or coordinate date received from an external source such as a battle management system. The same may be true of the tablet 200 discussed below. In addition, while the sensors/accessories 14 are shown as connected to rails, it shall be understood these elements can be integral or embedded in the upper receiver (or any other portion) of a firearm.

In one non-limiting embodiment the observer system is a spotter scope 136 that may be able to determine the location of a potential target. This may include determining the location of the scope 136 and the distance/direction to the target for instance, by combining a GPS location of the scope 136 with distance from a laser range finder and means for determining pointing direction as discussed below this information may then be transferred from the scope 136 to the firearm 10 and then routed through the rails and a location of the target displayed on a map shown on an accessory 14 such as a PDA. In this embodiment, firearm 10 of the system 130 is a sniper rifle, which is networked or communicates with observer system 136 through the communication network 131. In one embodiment, the communication between the firearm and the scope 136 (or the tablet 200 discussed below) may be direct point-to-point contact. It shall be understood that one or more of the accessories 14 may also communicate directly to the communication network 131 in any known manner including, but not limited to, rf communications, cellular communications, Bluetooth, and ZigBee and these communication devices may be any one of accessories 14 or peripheral device 132 which may be worn by an operator of one of the components. In one embodiment, the communication network is a wireless LAN network. The communication devices also being networked or in communication with other devices coupled to the powered rail(s) 18. Although only two items (e.g., firearm 10 and observer system 136) are illustrated it is understood that numerous items (e.g., more than two) may be networked to communicate with each other. For example, multiple firearms 10, observer systems 136 and numerous other devices or items may be networked through system 130 and data can be exchanged between any of the items through the communication network 131. Each item may target, identify, or exchange data (either unique to that item or common between items) with respect to multiple targets, locations, persons, or other items.

Figure 7:
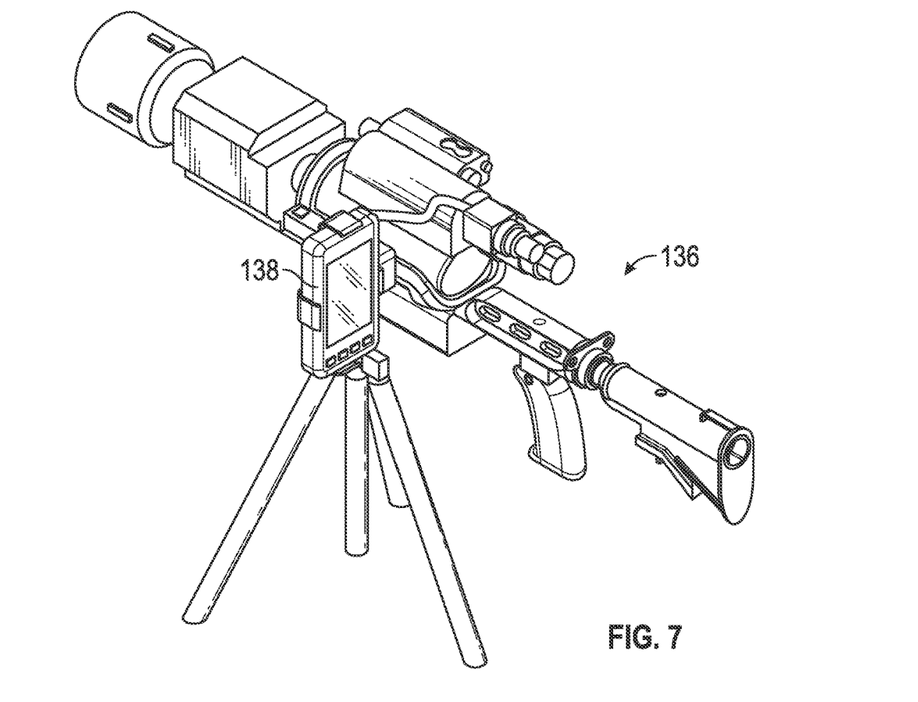
FIG. 7 illustrates an alternative example of a scope.

Another example of a spotter system 136 is illustrated as scope in FIG. 7. In this embodiment, the spotter system 136 may have a device 138 that communicates with an associated accessory 14 or device 140 illustrated in at least FIG. 1. For example, devices 138 and 140 may be GPS, laser range finder, PDA or targeting devices capable of communicating (e.g., wireless or otherwise) with each other and thus exchanging data and information.

The system illustrated in FIG. 3 shows a version of the system 130 capable of communication with and/or part of a battlefield management system (BMS) illustrated as tablet computer 200. Of course, the BMS could be implanted on other types of devices. Further, it shall be understood that the PDA 140 could be part of the system. In general, a battlefield management system is a system that integrates information acquired from multiple inputs and can be used coordinate movement/actions of multiple actors (e.g., soldiers).

As illustrated, one of the accessories 14 is coupled to an adapter 205 that allows it to communicate with the rail. The adapter 205 could condition power into a form desired by the accessory. For example, the adapter could be utilized to convert power into a form or particular pin layout used by a PDA or scope. Further, the adapter could include formatting logic to convert PDA or scope data into a form conductive for transmission through the rail 18. For example, parallel data could be converted into serial format.

In one embodiment, the system 130 includes a sensor 220 capable of determining a bearing of firearm 10. Such a sensor may be a compass or part of a GPS device or other device. In one embodiment, the angular (bearing, pitch and roll) information may be determined from sensors contained in PDA 140. In other embodiments, the angular sensors may be formed by one or more rotationally sensitive sensors such as inclinometers, rate gyros, accelerometers and magnometer mounted on the firearm 10. In one embodiment the firearm 10 includes at least one set of angular sensors 222 to determine the inclination, roll and bearing with respect to the horizontal axis of the firearm. The processor 51 may combine the data from the sensors (e.g., 220, 222) as well as information from another other accessory 14 on the firearm and then cause it to be transmitted via communication device 132 to the battle management system 200 or any other observer system 136. It shall be understood that any of the capabilities disclosed herein with respect to the rifle 10 may be applicable to the scope 136 or any other device included in system 130.

In one embodiment, the processor 51 collects data from the accessories 14 (herein, accessories will also include any sensor on the firearm) in either a polled or interrupt method via the data bus. The data bus can be either wired or wireless interfaces. The processor 51 may utilize a real time clock to routinely interrogate accessories 14 at a predetermined schedule. During these predetermined intervals the processor 51 reads the data and stores it into memory. In one embodiment, the data is tagged with a real time clock stamp to facilitate data processing. In one embodiment, one or more of the accessories 14 are interrupt driven. In such a case, an event causes the accessory 14 to send an interrupt to the processor 51 which, in turn, causes the processor 51 to collect data from the accessory 14.

Regardless of how collected, the data is transmitted from communication device 132 to the tablet 200, the observer system 136 or both. Further, either of observer 136 or the tablet 200 can send information back to the firearm 10.

In operation, processor 51 draws power from the power supply 84 and may discover connected accessories 14. In one embodiment, the discovery may include verifying that the accessory 14 is operable. In the case that the accessory 14 is a sensor, the processor 51 may configure the sensor based on its location on the firearm and function. The sensors can be navigation, acoustic or optical devices. The sensors all communicate to the processor via the data bus and report sensor data and status. The navigation sensors could be individual or integrated into a single package, and are GPS (military or commercial), accelerometer, rate gyro, magnometer (compass) or gyro scope and may sense and report in all three axial planes (x, y & z). The acoustic sensor may provide an acoustic signature of the environment around the firearm as well as of the firearm itself. The optical sensor may capture the optical spectrum in front of the weapon. The optical spectrum could be the visual, infrared, thermal, Short Wave Length, Medium Wave Length and Long Wave Length, etc.

It shall be understood that the format of the data stored/transmitted by the processor 51 can be varied and adapted to meet any preferred receiving performance. Further, while there are several different accessories 14 disclosed above, it shall be understood that the processor 51 may include the ability to synthesize the data from these accessories before transmitting the data. For example, if a camera is used to form a digital image of a target, the time and the position and orientation of the rifle 10 can be attached to that image before it is transmitted. Further, in some cases, the rifle 10 may include a video camera attached as an accessory. In such a case, the data (e.g., images or video) could be streamed in real-time with time/position data appended thereto or sent in periodic or interrupt driven intervals.

In some cases, the processor 51 may include the ability to process the data collected from the accessories 14. For example, the processor 51 may include instructions that allow it perform ballistics calculations, target range and angular offset calculation, and target tracking. Further, based on collected data, the number of shots taken, remaining ammunition, firearm performance and maintenance determinations and other firearm related calculations may be made. In one embodiment, the accessories 14/processor 51 monitor the internal ballistic life cycle and internal mechanisms of the firearm. As a firearm's mechanisms wear or become fouled, previously recorded events can be compared to determine the percentage of difference. Dependent on the parameter be monitored, such comparisons may determine the usefulness of the firearm.

Either in real time or at a prior time, map information related to an area in which the firearm 10 is, or in the future may be, located is provided to one or more of: microprocessor 42/51, PDA 140, and tablet 200. The map information may be in the form of an overhead aerial view in one embodiment and may be received from any source including, but not limited to reconnaissance information taken by satellite or other overhead device such as a drone. Of course, publicly available maps could be used in one embodiment. Based on a GPS location of the firearm 10, a portion of the map may be selected. Given the bearing of the firearm 10, a view of the map in the region in front of the firearm 10 may be selected and displayed on the PDA 140. Further, with the information the location of "friendlies" can be displayed on the maps as the table 200 includes information from all of the weapons in the system 130 and can place indicators on the map at those locations. Further, as an example, the location of a hostile party may be added to the map based, for example, the location of a friendly and a distance measured to the hostile by a laser range finder.

In one embodiment, the firearm 10 includes an inclinometer as one of the accessories 14. Assuming that ballistic information is known about a projectile (e.g., a bullet or grenade) that the firearm 10 (or an attachment thereto) fires, a projected impact point on the map be displayed.

Figure 4:
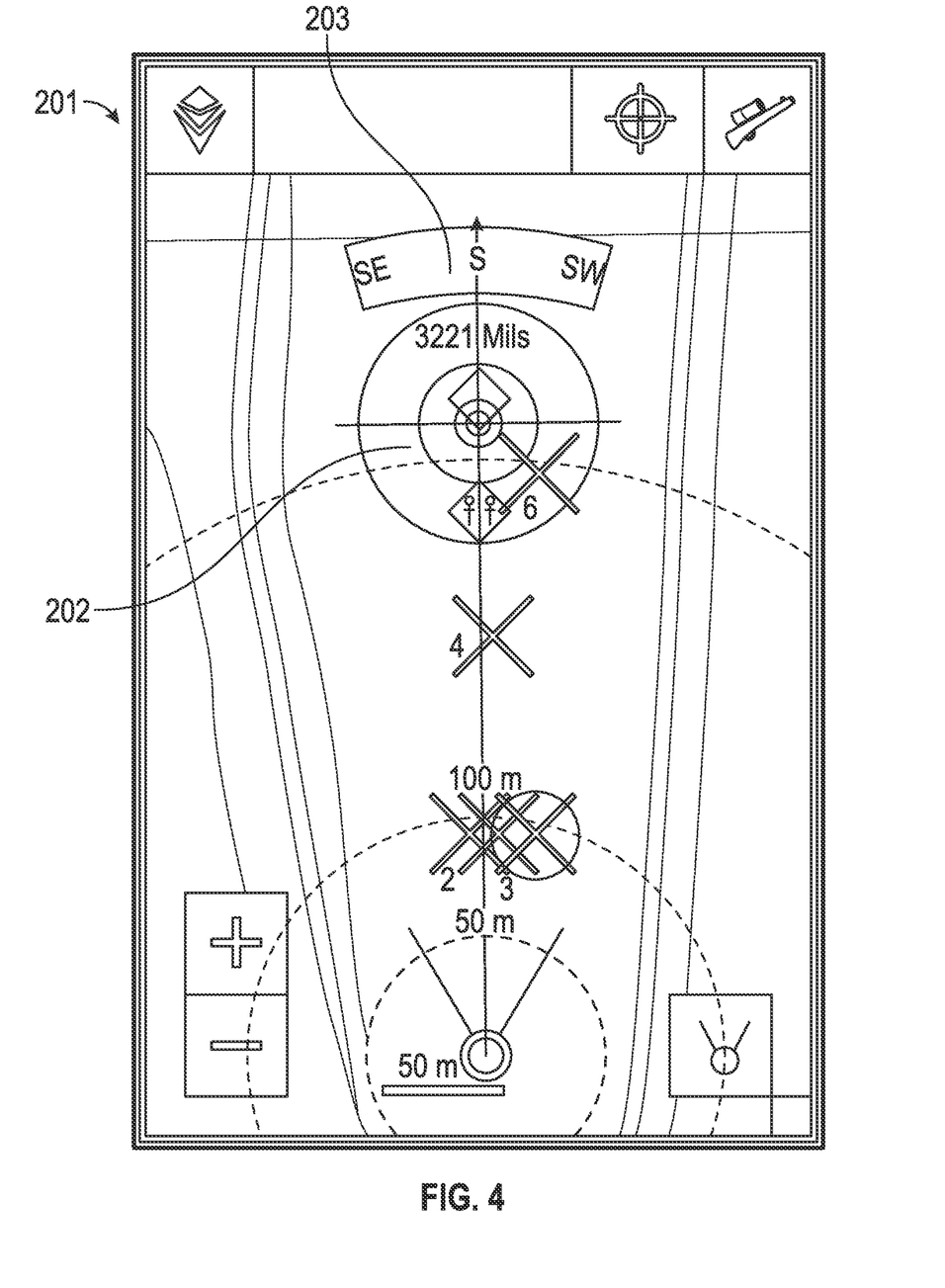
FIG. 4 is an example of display screen of an accessory that may be coupled to a firearm.

With reference to FIG. 4, an example of a display 201 of PDA 140 is illustrated. The bearing information (shown by compass 203) described above can be used to position a possible impact location 202 of the projectile in along the y axis. Similarly, information from an angular sensors and the ballistic information can be used to determine how far the projectile will travel and the, thus, determines the location of the impact location 202. As the firearm as raised upward, the impact location 202 translates up on the map 201.

Figure 5:
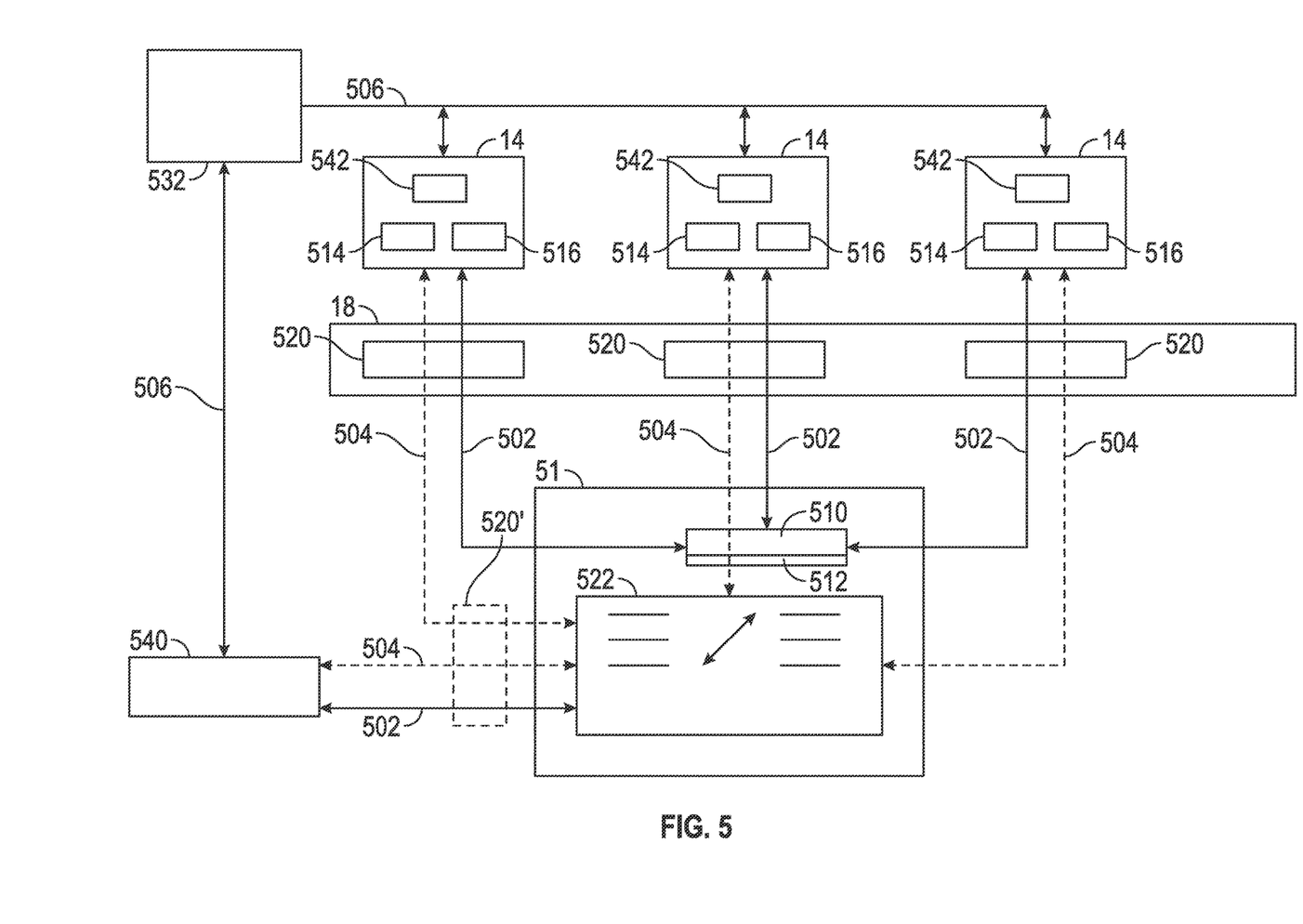
FIG. 5 is a diagram illustrating different possible communication paths in a firearm.

FIG. 5 schematically illustrates communication between various components on a firearm as disclosed herein. The firearm includes at least one rail 18 onto which several accessories 14 are coupled. The system includes three different communication channels shown as a low speed channel 502, a medium speed channel 504 and a high speed channel 506. The low speed channel 502 extends from and allows communication between the master processor 76 and any of the accessories 14. The low speed channel 502 can be driven by a low speed transmitter/receiver 510 in processor 51 that includes selection logic 512 for selecting which of the accessories 14 to route the communication to.

Each accessory 14 includes low speed decoding/encoding logic 514 to receive and decode information received over the low speed channel 502. Of course, the low speed decoding/encoding logic 514 can also include the ability to transmit information from the accessories 14 as described above.

In one embodiment, the low speed channel 502 carries data at or about 100 kB/s. Of course, other speeds could be used. The low speed channel 502 passes through a coupling 520. The coupling 520 could be galvanic or via inductive coil pairs. In one embodiment, the inductive coil pair could be replaced include a two or more core portions about which the coil pair is wound. In another embodiment, the cores can be omitted and the inductive coil pair can be implemented as an air core transformer. As illustrated, the couplings 520 are contained within the powering rail 18. Of course, one or more of the portions of the coupling can be displaced from the rail 18.

The medium speed channel 504 is connected to couplings 520 and shares them with low speed channel 502. For clarity, branches of the medium speed channel 504 as illustrated in dashed lines. As one of ordinary skill will realize, data can be transferred on both the low speed channel 502 and the medium speed channel at the same time. The medium speed channel 504 is used to transmit data between the accessories 14.

Both the low and medium speed channels 502, 504 can also be used to transmit data to or receive data from an accessory (e.g. a tether) not physically attached to the rail 18 as illustrated by element 540. The connection between the processor 51 can be either direct or through an optional inductive coil pair 520'. In one embodiment, the optional inductive coil pair 520' couples power or data or both to processor 51 which may be located in or near a handle portion (e.g., pistol grip) of a firearm.

To allow for communication between accessories 14 over the medium speed channel 504, the processor 51 can include routing logic 522 that couples signals from one accessory to another based on information either received on the medium speed channel 504. Of course, in the case where two accessories coupled to the rail 18 are communicating via the medium speed channel 502, the signal can be boosted or otherwise powered to ensure is can drive couplings 520 between the accessories.

In another example, the accessory that is transmitting the data first utilizes the low speed channel 502 to cause the processor 51 sets the routing logic 522 to couple the medium speed channel 504 to the desired receiving accessory. Of course, the processor 51 itself (or an element coupled to it) can be used to separate low and medium speed communications from one another and provide them to either the low speed transmitter/receiver 510 or the routing logic 522, respectively. In one embodiment, the medium speed channel 504 carries data at 10 MB/s.

FIG. 5 also illustrates a high speed channel 506. In one embodiment, the high speed channel 506 is formed by an optical data line and runs along at least a portion of the length of the rail 18. For clarity, however, the high speed channel 506 is illustrated separated from the rail 18. Accessories 14 can include optical transmitter/receivers 542 for providing signals to and receiving signals from the high speed channel 506. In one embodiment, a high speed signal controller 532 is provided to control data flow along the high speed channel 506. It shall be understood that the high speed signal controller 532 can be located in any location and may be provided, for example, as part of the processor 51. In one embodiment, the high speed signal controller 532 is an optical signal controller such as, for example, an optical router.

Figure 6:
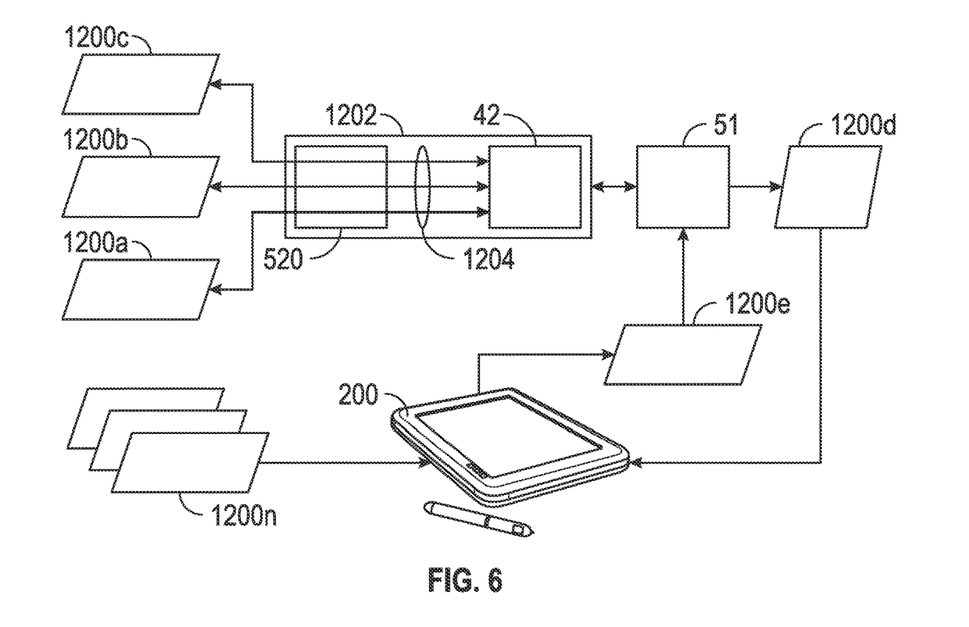
FIG. 6 is a dataflow diagram illustrating data transfer from rifle accessories to a central location and back.

FIG. 6 shows a dataflow of information as it may be transferred according to one embodiment. Accessory data 1200a, 1200b and 1200c is representative of data that may be transferred to or from accessories coupled to a rail system 1202 coupled to a firearm. The rail system 1202 may be formed as herein described. Of course other rail systems capable of supporting one or more accessories on a firearm may be utilized. The rail system 1202 may provide power to the accessories in one embodiment but that is not required. The rail system 18 may also provide a physical conduit for transmitting data to and from the accessories. As mentioned above and as more fully discussed below, the data 1200a-1200c passes through a coupling 520 that provides for inductive or galvanic transfer of the data from the accessory to the communication pathway (e.g., bus) 1204 provided by the rail system 1202. Of course, other energy transfer methods such as capacitive coupling may be utilized. Processor 42 controls communication over the bus 1204 and as such may be referred to as a bus processor in one embodiment. The bus processor 42 may be located in the rail system 1202 itself or in the upper or lower receiver of a firearm. The bus processor may be able to determine, in one embodiment, when an accessory is coupled to the rail system 1202. It should be noted that another processor (e.g. processor 51) may perform the bus control functions in one embodiment and, in such and embodiment, the bus processor 42 may be omitted.

The bus processor can allow, for example, for first accessory data 1200a to be transferred to the processor 51 first, followed by data 1200b and then 1200c in one embodiment. Of course, any ordering a data can be provided for. The data reaches processor 51 and then transformed into an output data set 1200d. In one embodiment, the output data set is a compilation of portions of the data 1200a-c. Output data set 1200d could also include additional information such as a time stamp. For example, assume data 1200a is GPS data from a GPS device coupled to the rail system 1200, data 1200b is bearing information and data 1200c is a target distance value. This data could be combined and time stamped to provide an accurate time sensitive location of a potential target. Data 1200d may also include manipulated data as well. Regardless, data 1200d is provided to computing device 200 (e.g., a battle management system). Data 1200d may be transmitted off of the rifle 10 in any manner including through one of the accessories (e.g., PDA 140).

Computing device 200 may also receive data from other battlefield devices (e.g., other rail systems) as generally indicated by data 1200n. The computing device takes some or all of the data that it has received and may, in one embodiment create mission data 1200e. This data is then transferred to processor 51 and subsequently provided to one or more of the accessories. An example (following from above) includes mission data 1200e that includes a map showing all of the targets identified by any of the rifles and data 1200e could be sent to any or all of the rifles that are connected to a particular network. The format and content of the each of the different data elements shown in FIG. 6 may be platform agnostic in one embodiment so that the system 1202 may integrated into any preexisting or later developed battle management system.

Figure 8:
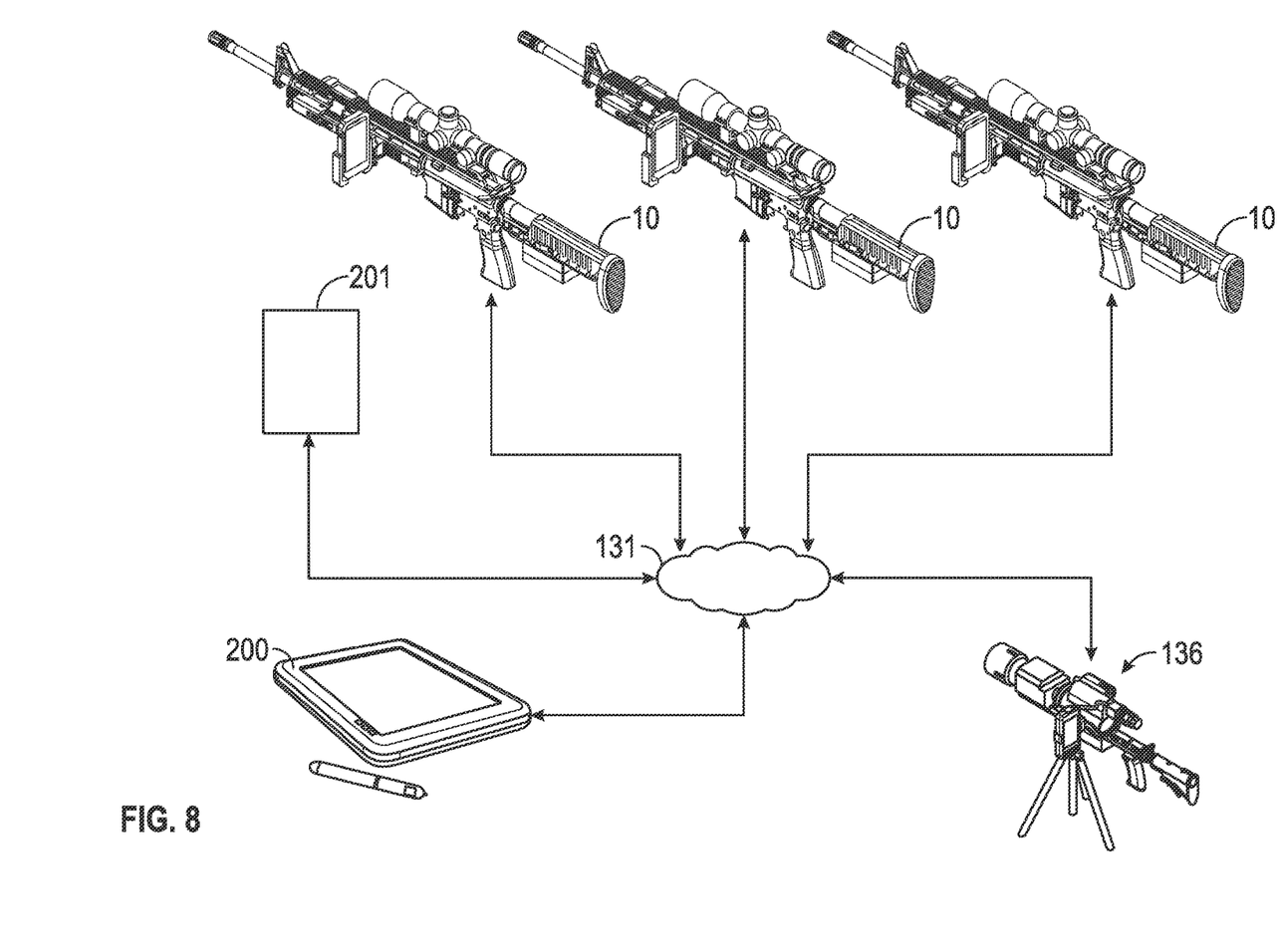
FIG. 8 illustrates multiple battlefield devices networked together.

The skilled artisan will realize that any number of rifles 10, spotter scopes 136, tablets 200 and the like may communicate with one another as shown in FIG. 8, other battlefield devices may also be included an indicated by reference numeral 201. For instance, grenade launchers, mortar launchers or any other element used to determine information or launch a projectile could communicate through network 131.

As referred to above, the rails 18 can be used to deliver power and/or data to the accessories 14. The power and/or data can be transferred bidirectionally to and from the rail to the accessory inductively or via a direct electrical (galvanic) connection.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. A networked battle system comprising:
   a communication network;
   a first rifle that includes at least one accessory coupled thereto that determines a bearing of the first rifle, wherein the first rifle includes at least one microprocessor located in any one of an upper receiver, a lower receiver or buttstock of the first rifle;
   a communication element allowing the at least one accessory to provide bearing information to the communication network;
   a battle management system in communication with the first rifle through the communication network that receives the bearing information from the accessory and updates a battle plan based on the bearing information to form an updated battle plan; and
   a display screen coupled to the first rifle that displays the updated battle plan.

2. The networked battle system of claim 1, further comprising:
   a battlefield device including a display device attached thereto;
   wherein the battle management system provides the updated battle plan to the display device through the communication network.

3. The networked battle system of claim 1, wherein the updated battle plan is a map that includes an indication of a location of a target.

4. The networked battle system of claim 1, wherein the first rifle further includes a laser distance measurement device and the updated battle plan is formed in part based on distance information received by the battle management system from the laser distance measurement device through the communications network.

5. The networked battle system of claim 1, wherein the communication network is a wireless local area network (WLAN).

6. The networked battle system of claim 5, wherein the WLAN connects directly to the at least one accessory and the communication element is part of the at least one accessory.

7. The networked battle system of claim 2, wherein the battlefield device includes a microprocessor that receives the updated battle plan and provides it to the display device.

\* \* \* \* \*